(12) United States Patent
Sobel (10) Patent No.: US 8,407,471 B1
(45) Date of Patent: Mar. 26, 2013

(54) SELECTING A NETWORK SERVICE FOR COMMUNICATING WITH A SERVER

(75) Inventor: William E. Sobel, Stevenson Ranch, CA (US)

(73) Assignee: Symantec Corporation, Mountain View, CA (US)

( * ) Notice: Subject to any disclaimer, the term of this patent is extended or adjusted under 35 U.S.C. 154(b) by 289 days.

(21) Appl. No.: 12/862,092

(22) Filed: Aug. 24, 2010

(51) Int. Cl.
*H04L 9/32* (2006.01)
*G06F 11/00* (2006.01)

(52) U.S. Cl. ............. 713/168; 726/22; 726/26; 709/223

(58) Field of Classification Search .................... None
See application file for complete search history.

(56) References Cited

U.S. PATENT DOCUMENTS

| | | | | |
|---|---|---|---|---|
| 7,774,592 | B2 * | 8/2010 | Ishikawa et al. | 713/150 |
| 2008/0104182 | A1 * | 5/2008 | Jimmei | 709/206 |
| 2010/0036969 | A1 * | 2/2010 | Perry et al. | 709/245 |
| 2010/0269174 | A1 * | 10/2010 | Shelest | 726/22 |
| 2010/0332680 | A1 * | 12/2010 | Anderson et al. | 709/245 |

* cited by examiner

*Primary Examiner* — Fikremariam A Yalew
(74) *Attorney, Agent, or Firm* — Fenwick & West LLP (57) ABSTRACT

The Domain Name System (DNS) can be used to query for security information in real time. A security module on a client detects a network connection and sends a test probe as a DNS resolution request to a DNS server associated with a security server via the network connection. The test probe requests resolution of a domain name for which the DNS server is authoritative. The security module analyzes a response to the test probe to determine whether the response is valid based on testing information included in the DNS response. Responsive to whether a valid response to the test probe is received, the security module selects a network service for subsequent communications via the network connection.

17 Claims, 4 Drawing Sheets

SELECTING A NETWORK SERVICE FOR COMMUNICATING WITH A SERVER

BACKGROUND

1. Field of Art

The disclosure generally relates to computer security and in particular to exchanging information using Domain Name System (DNS) queries.

2. Description of the Related Art

The Domain Name System (DNS) can be used to query for information in real time. While the DNS was originally intended to support domain name resolution services, the DNS server resolving the query can include arbitrary information in the response. Moreover, the DNS is designed to work quickly. Therefore, the DNS is used to support types of queries beyond name resolution. For example, a security vendor can use DNS queries to provide security-related information to clients.

One difficulty with using the DNS to provide non-standard information is that the data exchange between the client and intended DNS server might fail. Clients often connect to the Internet through Internet Service Providers (ISPs) and some ISPs manipulate DNS traffic to their own ends. Some ISPs block DNS traffic destined to non-ISP controlled servers. In addition, some ISPs perform non-standard caching of DNS responses by, e.g., ignoring Time-To-Live (TTL) values and caching prior responses for longer than the responses' specified validity periods.

More problematically, some ISPs transparently proxy DNS queries. Such proxied queries appear to the querying client to have been answered by the authoritative DNS server but, in fact, are handled by the ISP's own DNS server. This transparent proxying cannot be detected by the clients because the standard DNS provides no way of verifying that the true authoritative DNS server responded to the DNS query. As a result, applications on the client can fail because the DNS query appears to resolve normally, yet the response from the DNS server contains outdated or otherwise incorrect information.

Therefore, there is a need for securely detecting transparently-proxied DNS connections, as well as for detecting other situations that might interfere with DNS queries.

SUMMARY

The above and other needs are met by methods, computer-readable storage media, and systems for selecting a network service for communicating with a server via a network connection.

One aspect provides a computer-implemented method for selecting a network service for communication with a server. Embodiments of the method comprise detecting a network connection at a client and sending a test probe as DNS resolution request from the client to a DNS server associated with the server via the network connection. Responsive to receiving a response to the test probe, the method analyzes the response to determine whether the response is valid. The method further selects a network service for subsequent communications with the server via the network connection responsive to whether a valid response to the test probe was received.

Another aspect provides a non-transitory computer-readable storage medium storing executable computer program instructions for selecting a network service for communication with a server. The computer-readable storage medium stores computer program instructions for detecting a network connection at a client and for sending a test probe as DNS resolution request from the client to a DNS server associated with the server via the network connection. The computer-readable storage medium further comprises computer program instructions for determining a received response to the test probe is valid. The computer-readable storage medium further comprises computer program instructions for selecting a network service for subsequent communications with a server via the network connection responsive to whether a valid response to the test probe was received.

Still another aspect provides a computer system for selecting a network service for communication with a server. The system comprises a non-transitory computer-readable storage medium storing executable computer program modules including a network service initiation module, a probe generation module, a response analysis module and a network service selection module. The network service initiation module is for detecting a network connection at a client and the probe generation module is for sending a test probe as a DNS resolution request from the client to a DNS server associated with the server via the network connection. The response analysis module is for, responsive to receiving a response to the test probe, analyzing the response to determine whether the response is valid. The network service selection module is for selecting a network service for subsequent communications with a server via the network connection responsive to whether a valid response to the test probe was received.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

The disclosed embodiments have other advantages and features which will be more readily apparent from the detailed description, the appended claims, and the accompanying drawings, in which:

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and methods illustrated herein may be employed without departing from the principles described herein.

Figure 1:
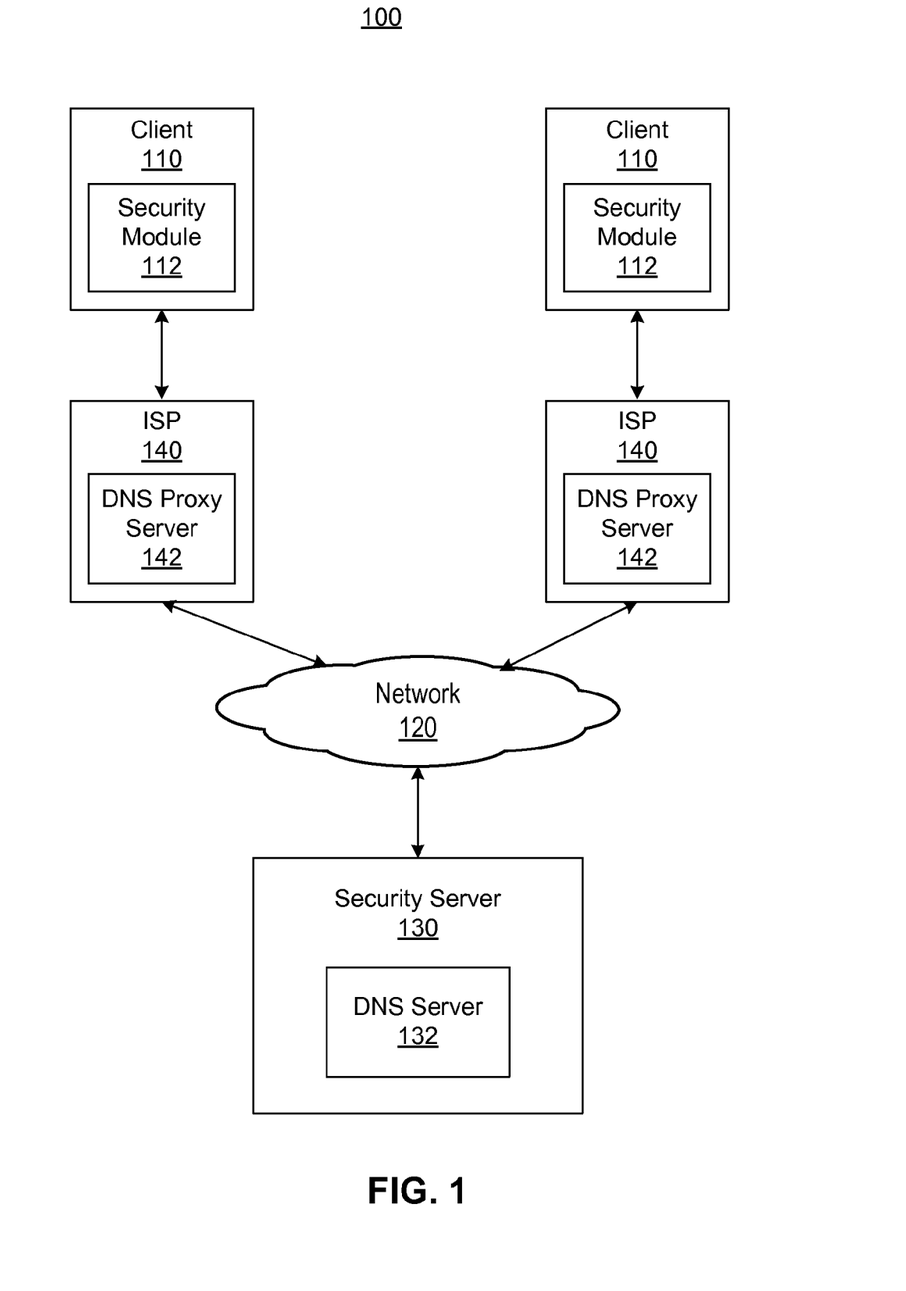
FIG. 1 is a high-level block diagram of a computing environment according to one embodiment.

FIG. 1 is a high-level block diagram of a computing environment 100 according to one embodiment. FIG. 1 illustrates a security server 130 and two clients 110 connected by a network 120 and ISPs 140. The illustrated environment 100 represents a typical computing environment where multiple clients 110 interact with the security server 130 to perform security-related tasks such as querying for security information, identifying and remediating malicious software (malware), and detecting spam. Only two clients 110 are shown in FIG. 1 in order to simplify and clarify the description. Embodiments of the computing environment 100 can have many clients 110 and security servers 130 connected to the network 120. In one embodiment, each client 110 is connected to the network 120 through an ISP 140. Other embodiments of the computing environment 100 can have two or more clients 110 connected to the network 120 through one ISP 140.

The client 110 is used by a user to perform security-related and other tasks. In one embodiment, the client 110 is a personal computer (PC) such as a desktop or notebook computer. In other embodiments, the client 110 is a mobile telephone, personal digital assistant, or other electronic device. For purposes of this description, the term "client" also includes computers such as servers and gateways that perform security-related tasks and interact with the security server 130.

The client 110 executes a security module 112 that detects malware residing at the client. The security module 112 makes queries to the security server 130 for security information. For example, the security module 112 can identify a file on the client 110 and query the security server 130 to request the reputation of the file (e.g., whether the file is malicious or legitimate).

The security module 112 can use a variety of network services to query the security server 130. For example, the security module 112 can send the query using the DNS by, e.g., appending a hash of a file to a domain name for which a DNS server 132 associated with the security server 130 is authoritative and sending the query as a DNS resolution request. Similarly, the security module 112 can use the hypertext transport protocol (HTTP), the file transfer protocol (FTP), or other network services for the query.

In one embodiment, the security module 112 uses the DNS if it is operable. To determine whether the DNS is operable for querying the security server 130, the security module 112 sends a test probe to the security server 130 via the DNS and analyzes the response. The test probe can request resolution of a domain name incorporating a hash of a file at the client 110, of a domain name incorporating a hash value known to the security server DNS server 132 to be used for testing, and/or incorporating other values. If the response is valid, the security module 112 continues to use the DNS to obtain security information from the security server 130. If the response is invalid, the security module 112 falls back on the other services for communicating with the security server 130.

The ISP 140 provides clients 110 with network access and related services. In addition, the ISP 140 operates a DNS proxy server 142 for responding to DNS requests from the clients 110. While the ISP 140 may provide the clients 110 with unimpeded access to the network 120 for most network services, the ISP may handle DNS traffic using ISP-specific policies. For example, the ISP 140 might block all DNS traffic to non-ISP DNS servers or transparently route all client-side DNS traffic to a DNS proxy server 142. In addition, the DNS proxy server 142 might not follow convention and ignore DNS parameters such as TTL that describe how long to cache DNS data. In addition, the DNS proxy server 142 might modify DNS responses received from authoritative servers before sending the responses to the clients 110.

The security server 130 interacts with the clients 110 via the network 120 to provide security information. The security server 130 operates a DNS server 132 that responds to DNS queries from the clients 110. If a DNS resolution request is received by the DNS server 132 associated with the security server 130, the security server 130 causes the DNS server 132 to send a DNS response that includes the requested security information. If the security server 130 receives a client query via a different network service (e.g., HTTP), the security server 130 provides the requested security information using that network service.

The DNS server 132 includes testing information in DNS responses that allows the security modules 112 of the clients 110 to determine whether the ISP 140 is interfering with the DNS communications. For example, in one embodiment the DNS server 132 includes a timestamp in a DNS response that indicates the time that the response was sent. The DNS server 132 also includes a TTL parameter in the response indicating for how long the response is valid. In addition, the DNS server 132 encrypts and digitally signs the testing information in the response using a private key having a public counterpart known to the client security modules 112. Depending upon the embodiment, the DNS server 132 can include the testing information in all DNS responses or in only a subset of DNS responses, such as responses to DNS queries incorporating hash values known to be used for testing. The security modules 112 of the clients 110 can decrypt the responses from the DNS server 132 to determine whether it is valid, or whether the ISP 140 is interfering with DNS communications.

The network 120 enables communications among the clients 110, ISP, 140 and the security server 130 and can comprise the Internet. In one embodiment, the network 120 uses standard communications technologies and/or protocols. Thus, the network 120 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 120 can include multiprotocol label switching (MPLS), the transmission control protocol/ Internet protocol (TCP/IP), the User Datagram Protocol (UDP), the HTTP, the simple mail transfer protocol (SMTP), the FTP, etc. The data exchanged over the network 120 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
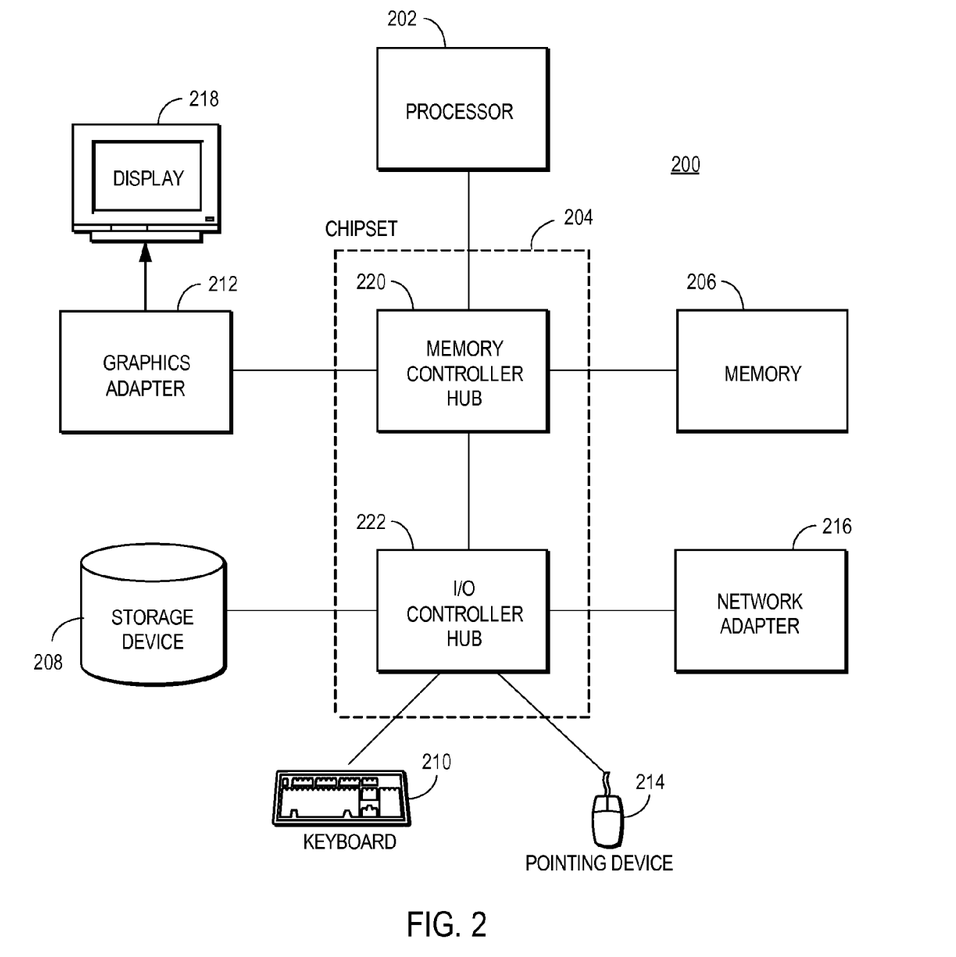
FIG. 2 is a high-level block diagram illustrating a typical computer for use as a client, security server, and/or DNS server.

FIG. 2 is a high-level block diagram of a computer 200 for acting as a client 110, security server 130, and/or DNS server 132. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 120.

As is known in the art, a computer 200 can have different and/or other components than those shown in FIG. 2. In addition, the computer 200 can lack certain illustrated components. For example, a computer 200 acting as a security server 130 can lack a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Figure 3:
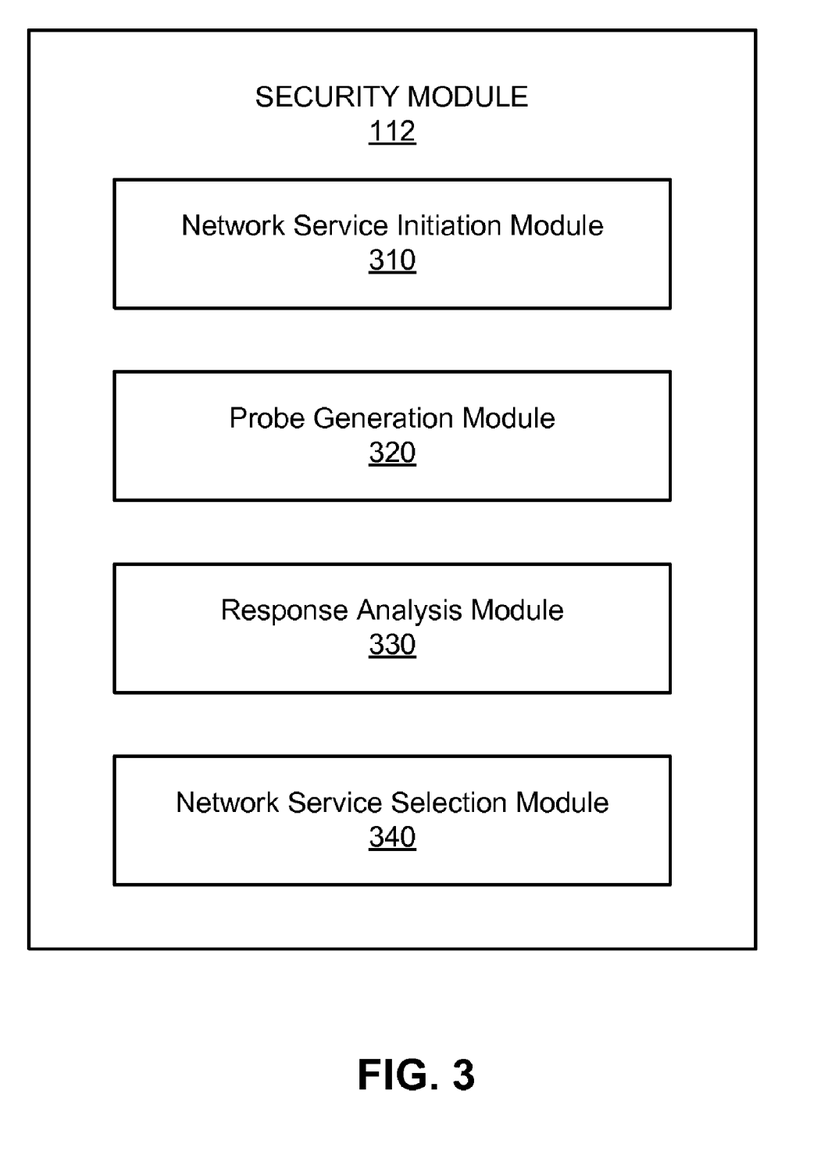
FIG. 3 is a block diagram illustrating a security module according to one embodiment.

FIG. 3 illustrates an embodiment of the security module 112 of a client 110. The security module 112 comprises various modules including a network service initiation module 310, a probe generation module 320, a response analysis module 330 and a network service selection module 340. In alternate embodiments, the security module 112 may comprise additional and/or different modules than the ones described here. Moreover, the functions can be distributed among the modules in different ways than described here.

The network service initiation module 310 monitors the client 110 to detect when the client is connected to a network and whether the network is recognized. In one embodiment, the initiation module 310 detects when a new network connection is established at the client 110. For example, a new connection can be established when the client 110 is booted up, when the client connects to a wireless access point, and/or when a network cable is plugged into the client 110. The initiation module 310 can make the detection by registering with the client operating system for callbacks related to networking services, by using available application programming interfaces (APIs) to enumerate available network connections and/or by periodically probing any known network connections to detect changes.

Upon detecting a new or changed network connection, an embodiment of the network service initiation module 310 determines whether the network is recognized. In one embodiment, the initiation module 310 identifies the IP address assigned to the client 110 by the network connection, and uses this address to recognize the network. Sometimes, a given network connection uses a fixed IP address and the initiation module 310 can recognize the network based on whether the connection has the fixed address. Other network connections use variable IP addresses. However, a client 110 that repeatedly connects to the Internet via the same ISP will often receive IP addresses within the same range. Thus, the initiation module 310 can use the IP address to determine whether the network connection is through the same ISP by determining whether the IP address is within the range previously observed for that ISP.

The probe generation module 320 generates test probes of network connections to determine if the network connections permit communications with the DNS server 132 operated by the security server 130. In one embodiment, the probe generation module 320 probes unrecognized networks identified by the initiation module 310. Embodiments of the probe generation module 320 can also periodically probe recognized network connections. In one embodiment, the probe generation module 320 probes by sending a DNS query to the DNS server 132 operated by the security server 130. For example, the probe generation module 320 can send a DNS query requesting resolution of an address incorporating a hash of a file stored on the client 110 or a predetermined hash used for test probes, and a domain name for which the DNS server 132 is known to be authoritative. If the ISP 140 does not interfere with DNS requests, the DNS query will be forwarded to, and answered by, the DNS server 132.

The response analysis module 330 analyzes a DNS response to the test probe to determine whether the response is from the DNS server 132 operated by the security server 130. In one embodiment, the response analysis module 330 verifies the digital signature of testing information contained within the response. The response analysis module 330 also attempts to decrypt the testing information in the DNS response using the decryption key (e.g., the public key counterpart to the private encryption key used by the DNS server 132). If the response analysis module 330 cannot verify and/or decrypt the testing information, then it is likely that the DNS response was either handled by a transparently-proxied DNS proxy server 142 at the ISP 140 or the response was otherwise modified by the ISP.

If the analysis module 330 successfully verifies and decrypts the testing information, it obtains the TTL value and timestamp contained therein. The analysis module 330 compares the timestamp with the current time (i.e., the time of the analysis) and evaluates the TTL value to determine whether the DNS response is still valid. That is, the analysis module 330 evaluates whether the delta from the timestamp to the current time exceeds the TTL value. If the DNS response is invalid because the TTL is exceeded, then it is likely that the ISP 140 is transparently-proxying DNS requests and caching DNS responses from authoritative servers for longer than it should. Otherwise, if the response is valid (i.e., the signature is verified, the testing information is decrypted, and the TTL is not exceeded), then an embodiment of the analysis module 330 concludes that the response is from the DNS server 132 operated by the security server 130. The analysis can differ in other embodiments. For example, in some embodiments the testing information is not signed and/or encrypted and thus the response is valid if the TTL is not exceeded.

The network service selection module 340 selects the network service that the security module 112 uses to communicate with the security server 130. As mentioned above, in one embodiment the selection module 340 selects the DNS as the network service if it is available, and otherwise uses another type of service. To this end, the selection module 340 receives the results of the analysis performed by the response analysis module 330 and determines whether the DNS response was valid. If so, the ISP 140 is likely not blocking DNS traffic to external DNS servers, and not operating its own DNS servers as transparent proxies. Therefore, the selection module 340 selects the DNS as the network service used for communications with the security server 130. If the DNS response was invalid, the selection module 340 selects an alternative network service for the communications, such as HTTP.

In one embodiment, the network service selection module 340 uses the result of the ISP determination made by the network service initiation module 310 to select the network service. The selection module 340 stores which network service was previously selected for a given ISP, and uses this network service next time the client 110 connects to the network 120 using that ISP. Thus, the selection module 340 can cache ISP 140/network service associations and use the associated service when the client 110 connects to the network 120 using a given ISP.

In another embodiment, the security module 112 does not send an explicit test probe, but rather treats each DNS query it sends to the DNS server 132 operated by the security server 130 as an implicit test probe. The security module 112 initially selects DNS as the network service used for communications with the security server 130 and the security module 112 uses DNS to query for security information. The DNS server 132 includes encrypted TTL and timestamp information in each response to the security modules 112 of the clients 110. When the security module 112 of the client receives a DNS response, the security module 112 decrypts and analyzes the TTL/timestamp information to validate the DNS response. The security module 112 continues to use DNS to query for security information unless it receives an invalid DNS response. If the security module 112 receives an invalid response, it switches to an alternative network service for the communications, such as HTTP.

Figure 4:
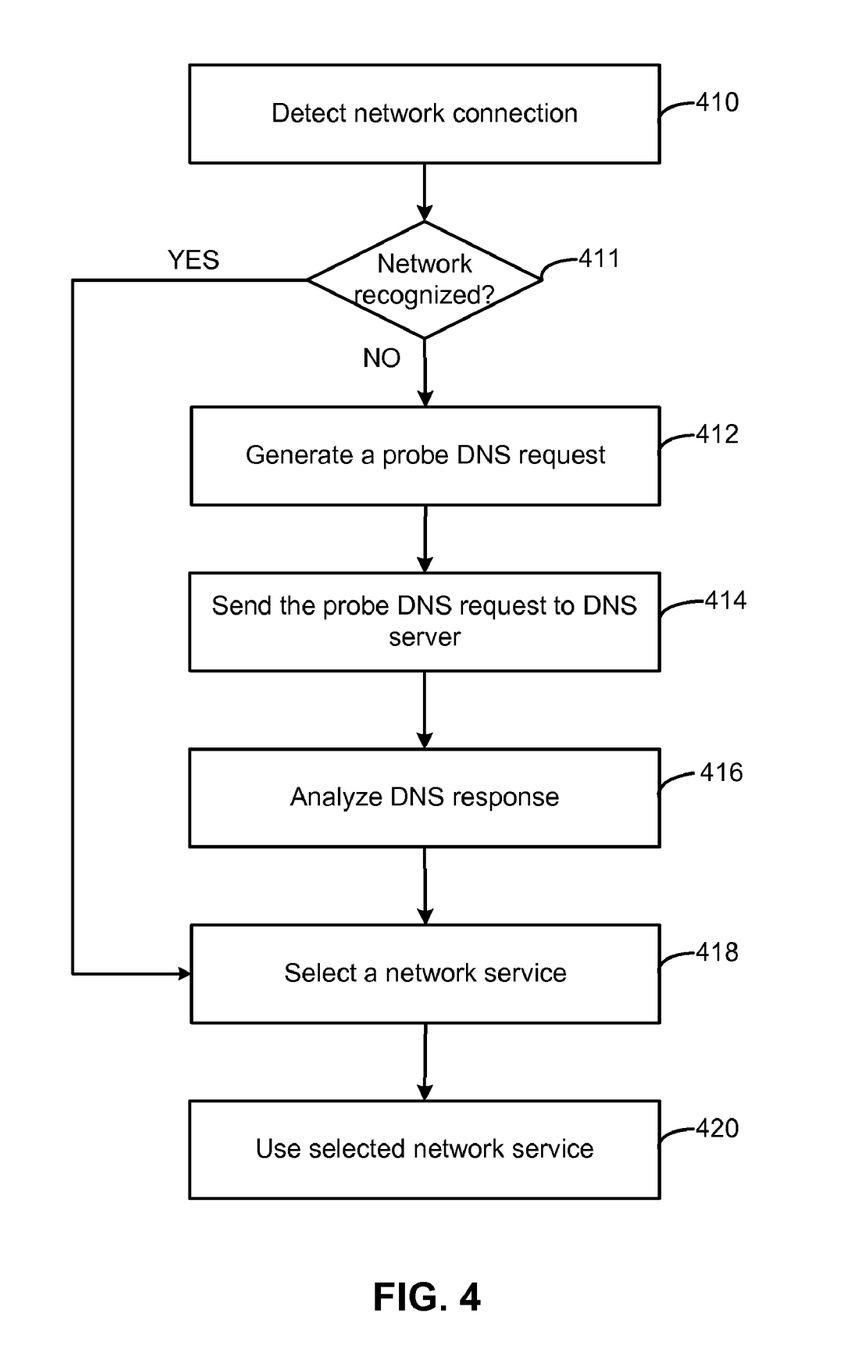
FIG. 4 is a flowchart illustrating steps for selecting a network service according to one embodiment.

FIG. 4 is a flowchart illustrating steps for selecting a network service according to one embodiment. Initially, the security module 112 detects 410 whether the client 110 is connected to a network. The security module 112 determines 411 whether the ISP is recognized, i.e., whether the client 110 has previously connected to the network using the same ISP 140. If the client 110 has previously connected using that ISP 140, the security module 112 selects 418 and uses 420 the network service that was previously used to communicate with the security server 130 for the ISP.

If 411 the ISP 140 is not recognized, the security module 112 generates 412 a test probe and sends 414 the probe to the security server 130 via the DNS. For example, the security module 112 can hash a file stored on the client 110 and send a DNS resolution request to "hash.security_server.com," where "hash" is the hash of the file, "security_server.com" is a domain name of the security server 130, and the DNS server 132 operated by the security server 130 is authoritative for such domain names. The security module 112 analyzes 416 the response to the probe, if one is received, to determine whether it is valid. If the DNS response is valid, then the ISP 140 likely does not block or transparently proxy DNS requests. Therefore, an embodiment of the security module 112 selects 418 the DNS as the network service and uses 420 DNS for subsequent communications with the security server 130. If the response is not received, or is invalid, then the ISP 140 is likely blocking or using a transparent proxy for DNS requests. Accordingly, an embodiment of the security module 112 selects 418 a different network service, such as HTTP, and uses 420 the selected network service to communicate with the security server 130. The security module 112 then performs actions such as generating a hash of a local file on the client 110, sending the hash in a request for security information to the security server 130 using the selected network service, and receiving the security information from the security server in response to the request. The security module 112 can use the security information to detect, remediate, and report malware at the client 110.

Some portions of above description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for spam detection and analysis through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method for selecting a network service for communicating with a server via a network, comprising:
   detecting a network connection at a client;
   sending a test probe as a Domain Name System (DNS) resolution request from the client to a DNS server associated with the server via the network connection, the test probe probing whether an intermediate DNS proxy is interfering with the DNS resolution request;
   responsive to receiving a response to the test probe, analyzing the response to determine whether the response is valid, a valid response indicating that the DNS resolution request is not being interfered with by an intermediate DNS proxy; and
   selecting a network service for subsequent communications with the server via the network connection responsive to whether a valid response to the test probe was received, wherein the DNS is selected as the network service for subsequent communications with the server responsive to a determination that the received response to the test probe is valid and a network service other than the DNS is selected for subsequent communications with the server responsive to a determination that the received response to the test probe is invalid.

2. The method of claim 1, wherein detecting a network connection at a client comprises:
   detecting when a new network connection is established at the client.

3. The method of claim 1, wherein sending the test probe comprises:
   generating a test DNS query requesting resolution of a domain name for which the DNS server associated with the server is authoritative.

4. The method of claim 3, wherein the domain name incorporates a value used for testing, and wherein the DNS server is adapted to generate a response to the test DNS query including testing information if the DNS server receives a DNS resolution request incorporating the value used for testing.

5. The method of claim 1, wherein analyzing the response to the test probe comprises:
   decrypting testing information in the DNS response using a decryption key that is a counterpart to an encryption key used by the DNS server; and
   responsive to decrypting the testing information using the decryption key, validating the response using a timestamp and time-to-live (TTL) information within the decrypted testing information to determine whether the response is valid.

6. The method of claim 1, further comprising:
   detecting a new network connection at the client;
   identifying an internet service provider (ISP) associated with the new network connection;
   determining a network service previously selected for the ISP; and
   using the previously selected network service for subsequent communications with the server via the new network connection.

7. A non-transitory computer-readable storage medium storing executable computer program instructions for selecting a network service for communicating with a server via a network, the computer program instructions comprising instructions for:
   detecting a network connection at a client;
   sending a test probe as a Domain Name System (DNS) resolution request from the client to a DNS server associated with the server via the network connection, the test probe probing whether an intermediate DNS proxy is interfering with the DNS resolution request;
   responsive to receiving a response to the test probe, analyzing the response to determine whether the response is valid, a valid response indicating that the DNS resolution request is not being interfered with by an intermediate DNS proxy; and
   selecting a network service for subsequent communications with the server via the network connection responsive to whether a valid response to the test probe was received, wherein the DNS is selected as the network service for subsequent communications with the server responsive to a determination that the received response to the test probe is valid and a network service other than the DNS is selected for subsequent communications with the server responsive to a determination that the received response to the test probe is invalid.

8. The computer-readable storage medium of claim 7, wherein the computer program instructions for detecting a network connection at a client comprise instructions for:
   detecting when a new network connection is established at the client.

9. The computer-readable storage medium of claim 7, wherein the computer program instructions for sending the test probe comprise instructions for:
   generating a test DNS query requesting resolution of a domain name for which the DNS server associated with the server is authoritative.

10. The computer-readable storage medium of claim 9, wherein the domain name incorporates a value used for testing, and wherein the DNS server is adapted to generate a response to the test DNS query including testing information if the DNS server receives a DNS resolution request incorporating the value used for testing.

11. The computer-readable storage medium of claim 7, wherein the computer program instructions for analyzing the response to the test probe comprise instructions for:
   decrypting testing information in the DNS response using a decryption key that is a counterpart to an encryption key used by the DNS server; and
   responsive to decrypting the testing information using the decryption key, validating the response using a timestamp and time-to-live (TTL) information within the decrypted testing information to determine whether the response is valid.

12. The computer-readable storage medium of claim 7, further comprising computer program instructions for:
   detecting a new network connection at the client;
   identifying an internet service provider (ISP) associated with the new network connection;
   determining a network service previously selected for the ISP; and
   using the previously selected network service for subsequent communications with the server via the new network connection.

13. A system for selecting a network service for communicating with a server via a network comprising:
   a non-transitory computer-readable storage medium storing executable computer program modules comprising:
      a network service initiation module for detecting a network connection at a client;
      a probe generation module for sending a test probe as a Domain Name System (DNS) resolution request from the client to a DNS server associated with the server via the network connection, the test probe probing whether an intermediate DNS proxy is interfering with the DNS resolution request;
      a response analysis module for, responsive to receiving a response to the test probe, analyzing the response to determine whether the response is valid, a valid response indicating that the DNS resolution request is not being interfered with by an intermediate DNS proxy; and
      a network service selection module for selecting a network service for subsequent communications with the server via the network connection responsive to whether a valid response to the test probe was received, wherein the DNS is selected as the network service for subsequent communications with the server responsive to a determination that the received response to the test probe is valid and a network service other than the DNS is selected for subsequent communications with the server responsive to a determination that the received response to the test probe is invalid; and a processor for executing the computer program modules.

14. The system of claim 13, wherein sending the test probe comprises:
   generating a test DNS query requesting resolution of a domain name for which the DNS server associated with the server is authoritative.

15. The system of claim 14, wherein the domain name incorporates a value used for testing, and wherein the DNS server is adapted to generate a response to the test DNS query including testing information if the DNS server receives a DNS resolution request incorporating the value used for testing.

16. The system of claim 13, wherein analyzing the response to the test probe comprises:
   decrypting testing information in the DNS response using a decryption key that is a counterpart to an encryption key used by the DNS server; and
   responsive to decrypting the testing information using the decryption key, validating the response using a timestamp and time-to-live (TTL) information within the decrypted testing information to determine whether the response is valid.

17. The system of claim 13, wherein the network service initiation module is further for detecting a new network connection at the client, for identifying an internet service provider (ISP) associated with the new network connection, and for determining a network service previously selected for the ISP, and wherein the network service selection module is further for using the previously selected network service for subsequent communications with the server via the new network connection.

* * * * *